(12) United States Patent
Saito et al.

(10) Patent No.: US 7,073,614 B2
(45) Date of Patent: Jul. 11, 2006

(54) BIPEDAL ROBOT WITH STORAGE BATTERY

(75) Inventors: Yasuhisa Saito, Sayama (JP); Teruyuki Oka, Sayama (JP); Toratsugu Kuwahara, Sayama (JP); Atsushi Demachi, Sayama (JP); Toshiyuki Higashi, Sayama (JP); Kenichi Ogawa, Wako (JP); Takuro Koyanagi, Wako (JP); Susumu Miyazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/399,063

(22) PCT Filed: Oct. 10, 2001

(86) PCT No.: PCT/JP01/08883

§ 371 (c)(1),
(2), (4) Date: Sep. 11, 2003

(87) PCT Pub. No.: WO02/30631

PCT Pub. Date: Apr. 18, 2002

(65) Prior Publication Data

US 2004/0050595 A1    Mar. 18, 2004

(30) Foreign Application Priority Data

| Oct. 12, 2000 | (JP) | .............................. 2000-312710 |
| Oct. 12, 2000 | (JP) | .............................. 2000-312713 |
| Oct. 12, 2000 | (JP) | .............................. 2000-312716 |

(51) Int. Cl.
*B62D 57/02* (2006.01)

(52) U.S. Cl. ............................ 180/8.6; 901/1; 700/245

(58) Field of Classification Search .......... 180/8.1–8.6, 180/65.1; 901/1; 700/245–247; 701/23; 320/116, 120; 446/376–384
See application file for complete search history.

(56) References Cited

U.S. PATENT DOCUMENTS

| 3,243,916 | A | * | 4/1966 | Ryan | .......................... 446/355 |
| 3,421,258 | A | * | 1/1969 | Gardel et al. | ................ 446/351 |
| 3,609,909 | A | * | 10/1971 | Gardel et al. | ................ 446/355 |
| 5,045,015 | A | * | 9/1991 | Arad et al. | .................. 446/355 |
| 5,158,493 | A | * | 10/1992 | Morgrey | ..................... 446/355 |
| 5,224,896 | A | * | 7/1993 | Terzian | ........................ 446/355 |
| 5,318,471 | A | * | 6/1994 | Glovier | ....................... 446/268 |
| 5,459,659 | A | | 10/1995 | Takenaka | ............... 364/424.02 |

(Continued)

FOREIGN PATENT DOCUMENTS

EP    1 081 027 A2    3/2001

(Continued)

*Primary Examiner*—Lesley D. Morris
*Assistant Examiner*—L. Lum
(74) *Attorney, Agent, or Firm*—Standley Law Group LLP

(57) ABSTRACT

A bipedal robot of the present invention has a trunk consisting of an upper trunk and a lower trunk which are rotatable around a rotation axis relative to one another. The upper trunk has shoulders on the right and left sides. An arm is provided at each shoulder. A pair of right and left legs is attached to lower ends of the lower trunk. A storage battery is mounted to the back of the upper trunk, positioned within a shoulder width. The storage battery is positioned below the top of a head mounted on the upper trunk. When the robot walks a narrow passage or corridor having a width slightly larger than the width thereof, for example, this arrangement prevents the storage battery from interfering with the passage or the like.

2 Claims, 14 Drawing Sheets

U.S. PATENT DOCUMENTS

| | | | |
|---|---|---|---|
| 5,631,537 A * | 5/1997 | Armstrong | 320/118 |
| 6,064,167 A | 5/2000 | Takenaka et al. | 318/568.12 |
| 6,184,656 B1 * | 2/2001 | Karunasiri et al. | 320/119 |
| 6,189,635 B1 * | 2/2001 | Schuler et al. | 180/68.5 |
| 6,236,181 B1 * | 5/2001 | Baan | 318/500 |
| 6,435,936 B1 * | 8/2002 | Rehkemper et al. | 446/297 |
| 6,472,098 B1 * | 10/2002 | Sawada et al. | 429/163 |
| 6,480,761 B1 * | 11/2002 | Ueno et al. | 700/245 |
| 6,509,718 B1 * | 1/2003 | Sakai et al. | 320/134 |
| 6,537,130 B1 * | 3/2003 | Lee et al. | 446/375 |
| 6,564,888 B1 * | 5/2003 | Gomi et al. | 180/8.6 |
| 6,580,969 B1 * | 6/2003 | Ishida et al. | 700/245 |

FOREIGN PATENT DOCUMENTS

| | | |
|---|---|---|
| EP | 1 103 450 A1 | 5/2001 |
| JP | 62097005 | 10/1985 |
| JP | 63150176 | 5/1989 |
| JP | 05337849 | 5/1992 |

\* cited by examiner

BIPEDAL ROBOT WITH STORAGE BATTERY

TECHNICAL FIELD

This invention relates generally to a bipedal robot having a storage battery as a driving power source and, more particularly, to an arrangement of the storage battery in the robot.

BACKGROUND ART

A humanoid bipedal robot having two legs extended from a hip of a lower part of a trunk, two arms extended from shoulders on right and left sides of the trunk, and a head containing an imaging system for vision of the robot mounted on an upper part of the trunk is disclosed, for example, in Japanese Patent Laid-Open Publication No. SHO-62-97005 and Japanese Patent Laid-Open Publication No. SHO-63-150176.

The applicant of the present invention presents a technique of stabilizing control in attitude of a bipedal robot based on an inverted pendulum dynamic model in Japanese Patent Laid-Open Publication No. HEI-5-337849 (U.S. Pat. No. 5,459,659) as an attitude stabilizing control system for a bipedal robot.

This robot attitude stabilizing control based on the inverted pendulum dynamic model is purported to torque-control ankles of the robot on the basis of behavioral characteristics in swings of the robot in its upper position. A robot stabilized in attitude in such a manner is more easily stabilized in attitude when the center of gravity of the entire robot is positioned higher than when the center of gravity is positioned lower.

There is a power supply system in which power for operating legs, arms and other components of a bipedal robot is supplied to the robot via a cable from outside. This supply system, however, limits the movable range of the robot by the existence of the cable, and it is troublesome to handle the cable. For these reasons, it is preferred to mount a storage battery as a power source for operating a robot.

However, in mounting a storage battery to a robot, there are several problems to be solved with respect to a large weight of the storage battery, an appearance of the robot made larger to some extent by the battery, the relationship between the storage battery and a rotation axis with which an upper part of a trunk of the robot to which the storage battery is mounted is made rotatable relative to a lower part of the trunk, and securing sufficient capacity of the storage battery.

DISCLOSURE OF THE INVENTION

The present invention was made in view of the above problems, and provides a bipedal robot with a storage battery as a power source for operation, in which the storage battery is prevented from interfering with surroundings when the robot walks or moves, and the storage battery can have large capacity.

According to a first aspect of the present invention, there is provided a bipedal robot with a storage battery comprising: a trunk comprising an upper trunk having shoulders at right and left sides and a lower trunk positioned below the top of the upper trunk, the upper trunk and the lower trunk being mounted rotatably about a rotation axis relative to one another; two legs extending from lower ends of the lower trunk; two arms extending from the shoulders of the upper trunk; a head provided on an upper end of the upper trunk; and a storage battery mounted on a back surface of the upper trunk, being positioned below the head in a region within a shoulder width of the trunk.

Since the storage battery mounted on the robot of the present invention is thus positioned at the upper trunk and below the head, the storage battery is in an upper position of the robot. This enables positioning higher the center of gravity of the robot as a whole with the storage battery mounted thereon, closer to the head of the robot, resulting in an appropriate attitude stabilization control of the robot based on an inverted pendulum dynamic model. Further, since the storage battery is mounted in a region within the shoulder width of the trunk, the minimum width of a passage where the robot can pass through can be closer to the shoulder width, and the robot is prevented from interfering with surroundings during walking or moving. Further, since the storage battery is mounted on the back surface of the upper trunk within the shoulder width, an open large back-space of the upper trunk can be utilized to mount the storage battery with large capacity thereon.

Desirably, the storage battery has a plurality of battery modules arranged in a middle part and in right and left parts on respective sides of the middle part and electrically connected to one another. Thus individual cells of the storage battery are securely held in module, which improves stability in retaining the storage battery when the robot walks or moves.

In a preferred form, each of the battery modules is provided with an outer connection terminal exposed at an outer surface thereof, and can be connected to a voltmeter via the outer connection terminal, which enables checking respective voltages of the battery modules constituting the storage battery. This resultantly allows checking respective qualities of the battery modules, relatively facilitating replacement of a defective one of the battery modules.

It is preferred to use a lithium-ion battery for the storage battery used in the present invention for making the bipedal robot walk or move because it has larger energy density and lightweight, and enables long-time driving.

Preferably, the storage battery comprises a plurality of battery modules having different storage capacities, the plurality of battery modules being united and housed in a case, smaller-capacity one of the battery modules being arranged in a middle part, larger-capacity one being arranged on each side of the battery module in the middle part. Thus when the battery module with smaller capacity is arranged in the middle part, the rotation axis is arranged in the vicinity of the battery module in the middle part, which prevents interference between the rotation axis and the storage battery. Arranging the battery modules with larger capacity on two sides of the battery module in the middle part allows securing sufficient capacity of the storage battery while limiting the lateral width dimension of the storage battery as a whole, achieving compactness of the storage battery.

In a specific form, the larger-capacity battery module is housed in a case which protrudes forwards toward the trunk so as to surround the rotation axis. Thus the battery module as a whole is arranged around the rotation axis, the mass of the battery module is prevented from providing increased moment of inertia around the rotation axis when the trunk with the storage battery mounted thereon rotates. A front part of the protruding case is tapered to protrude. Thus the tapered front part of the case avoids interference with the rotation axis. Further since a cell is housed in the tapered part, the battery module can be increased in capacity, which allows securing sufficient capacity of the storage battery while achieving the compactness of the storage battery.

The storage battery of the present invention comprises a plurality of battery modules each having a plurality of cells connected in series and housed in an inner case, the plurality of battery modules being connected in series and housed in an outer case. Thus the individual cells are connected in series to constitute the battery module, and wires are united in each battery module to enable collective wiring, which eliminates complicated or tangled wires for connection between the battery cells. Further the arrangement of the connection terminal of the battery module can be simplified.

Desirably, the outer case comprises a case body having a bottom and an upper opening, and a cover for closing the opening of the case body, the case body and the cover each having protrusions for positioning the inner cases constituting the battery modules. Thus since the outer case is provided with the protrusions for positioning, the battery modules are precisely positioned when housed without dislocation. The protrusions for positioning are, according to an embodiment, for example, provided on an inner surface of the bottom of the case body and on an inner surface of the cover, respectively. When the battery modules are housed in the outer case, the battery modules are positioned only by being inserted from above the case body and putting the cover as a lid thereover.

BEST MODE FOR CARRYING OUT THE INVENTION

Preferred embodiments of the present invention will be described below with reference to the accompanying drawings. Forward and backward directions of a robot are the directions orthogonal to both a direction in which two legs of the robot in an upright state are aligned (a lateral direction of the robot) and an up and down direction (a vertical direction).

Figure 1:
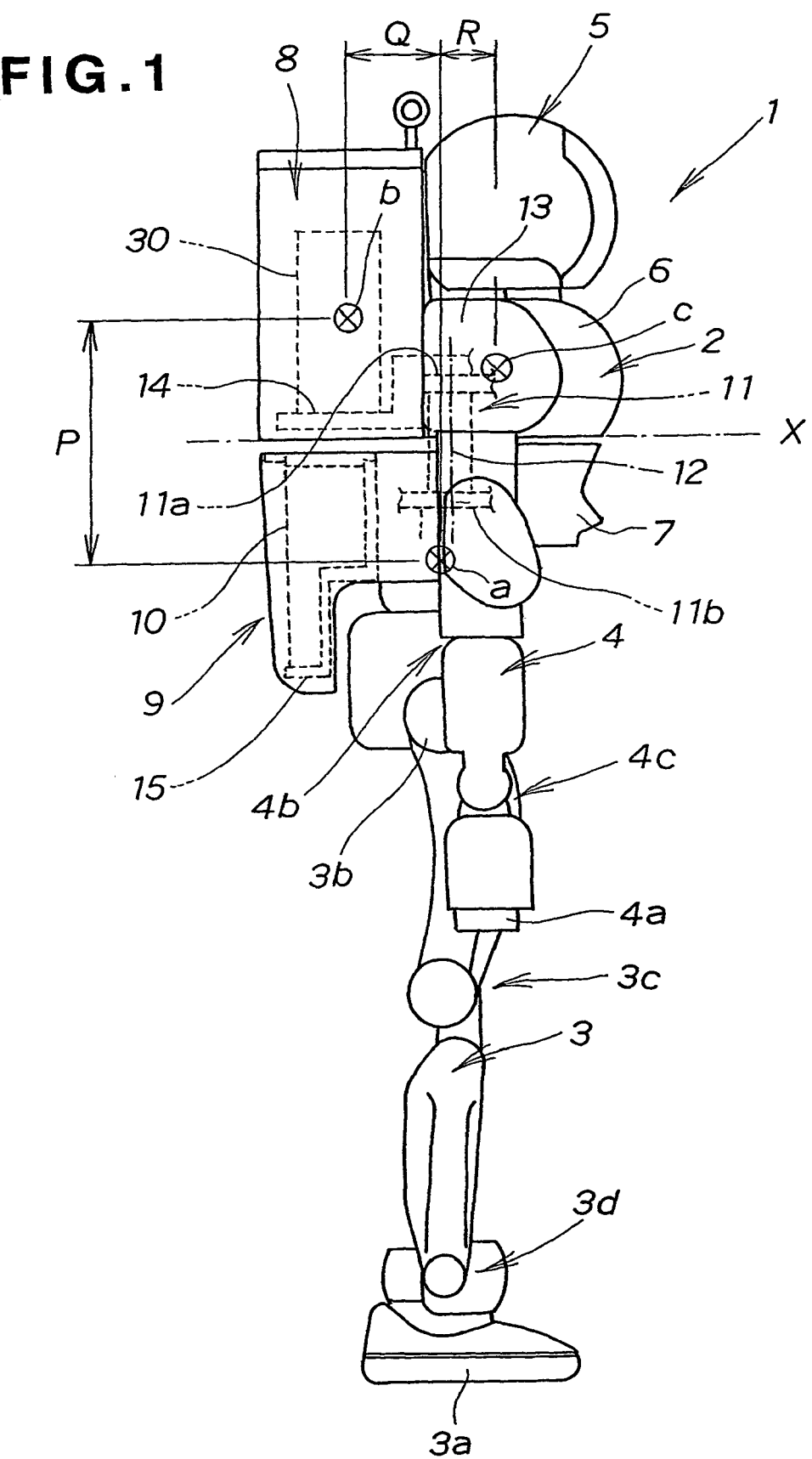
FIG. 1 is a side view showing a bipedal robot in an upright state with a storage battery mounted thereon according to an embodiment of the present invention.
Figure 2:
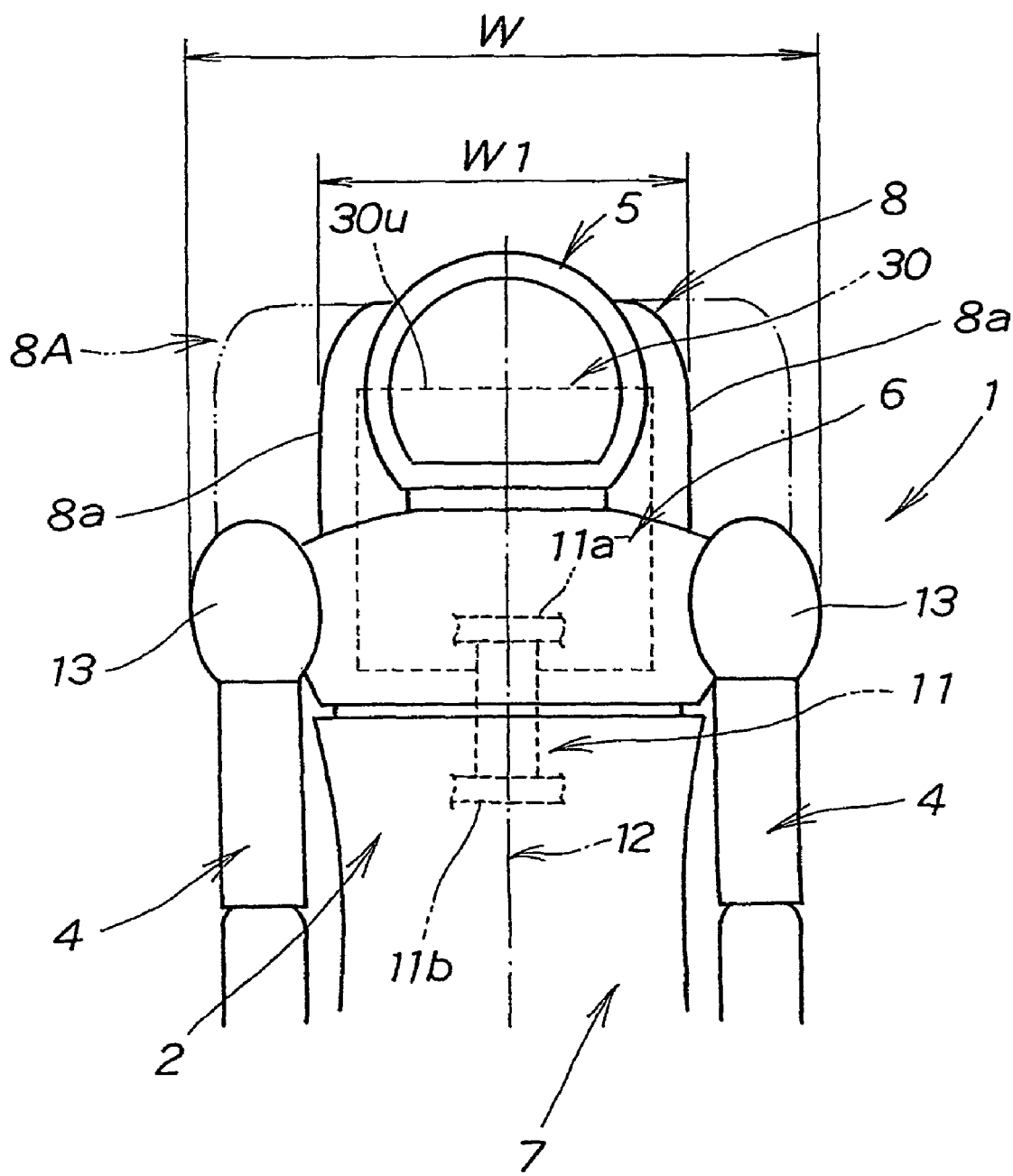
FIG. 2 is a front view showing a trunk part of the robot in FIG. 1.

A bipedal robot 1 as shown in FIGS. 1 and 2 is a humanoid robot having a trunk 2, a pair of right and left legs 3, a pair of right and left arms 4, and a head 5 provided on an upper end of the trunk 2.

The trunk 2 of the robot 1 serving as the main body is separated into upper and lower parts as an upper trunk 6 positioned above a chain line denoted by reference sign X, and a lower trunk 7 positioned below the line. The right and left arms 4 are connected to the respective sides of the upper trunk 6. The head 5 is supported on the upper end of the upper trunk 6. An imaging system not shown for the vision of the robot and other components are housed in the head 5. A storage battery 30 mounted on a back surface of the upper trunk 6 is covered by a subbody 8. The right and left legs 3 are connected to lower ends of the lower trunk 7. A control unit 10 (an electronic control unit "ECU" mainly composed of a microcomputer) for the operation of the robot is housed in a subbody 9 that is provided on a back surface of the lower trunk 7.

The subbody 8 of the upper trunk 6 has a box-like shape and is detachably attached to the back of the upper trunk 6. The subbody 9 of the lower trunk 7 has a box-like knapsack-like shape and is detachably attached to the back of the lower trunk 7.

The storage battery 30 held in the subbody 8 of the upper trunk 6 is demountably supported on a supporting frame 14 provided at the upper trunk 6. The control unit 10 held in the subbody 9 of the lower trunk 7 is demountably supported on a supporting frame 15 provided at the lower trunk 7.

A rotation mechanism 11 having a rotation axis 12 for rotating either the upper trunk 6 or lower trunk 7 relative to the other is provided inside the upper trunk 6 and lower trunk 7. An upper part 11a of the rotation mechanism 11 is attached to the upper trunk 6. A lower part 11b of the rotation mechanism 11 is attached to the lower trunk 7. Thus the upper trunk 6 and the lower trunk 7 are connected to one another via the rotation mechanism 11, being rotatable about the rotation axis 12.

The robot 1 as shown in FIG. 1 is in a standard attitude in which the upper trunk 6 and the lower trunk 7 are in agreement with one another in a forward and backward direction. A shoulder 13 is provided on each side of the upper trunk 6. A shoulder joint mechanism not shown is housed in each shoulder 13. The arm 4 is extended from the shoulder 13. The arm 4 has an elbow joint 4b and a wrist joint 4c between a front end 4a of the arm 4 and the shoulder 13. Each leg 3 has a knee joint 3c and an ankle joint 3d between a foot 3a and a hip joint 3b.

In addition to the above components, the bipedal robot 1 has an electric motor for driving upward or downward the imaging system housed in the head 5, electric motors for driving the joints of the legs 3 and arms 4, sensors for detecting rotational positions of those electric motors (rotational positions of the joints), sensors for detecting loads and moments acting on the foots 3a of the legs 3 and the front ends 4a of the arms 4, sensors for detecting an angle of inclination and an inclined angular velocity of the trunk 2, and something like those.

Here the reference center of gravity of the bipedal robot 1 in an upright state as shown in FIG. 1, with the storage battery 30 removed, is in point a, for example. The gravity point of the storage battery 30 housed in the subbody 8 when mounted to the robot 1 is in point b that positions above the gravity point a by distance P and positions rearward by distance Q. The center c of the shoulder 13 is positioned forward of the gravity point a by distance R.

With the above arrangement of the gravity points, the gravity point b of the storage battery 30 having a weight is positioned above the reference gravity point a, so that the center of gravity of the robot 1 as a whole, with the storage battery 30 mounted to the robot 1, exists in a position higher than the reference gravity point a. This makes behavioral characteristics in attitude of the robot in better conformity with behavioral characteristics of an inverted pendulum. As a result, attitude stabilization control can be based on an inverted pendulum model, to provide proper stabilization control in attitude of the robot, securing good stability in attitude of the robot.

The center c of the shoulder 13 positions forward of the reference gravity point a, closer to the front surface of the robot, so that the arm 4 extended forward allows the front end 4a of the arm 4 to reach a relatively farther point in front of the robot, and to grasp an object at the farther point or to do something like that.

As shown in FIG. 2, the shoulders 13 are respectively arranged on the right and left of the upper trunk 6 of the trunk 2, and the right and left arms 4, 4 are respectively extended from the shoulders 13, 13.

The storage battery 30 mounted to the back of the upper trunk 6 via the supporting frame 14 has a lateral width sufficiently smaller than a shoulder width W of the robot 1, and is positioned within the shoulder width W. A width W1 of the subbody 8 holding the storage battery 30 shown in a broken line is made sufficiently smaller than the shoulder width W and is positioned within the shoulder width W. The storage battery 30 is arranged with its upper end 30u positioned below the top of the head 5.

Figure 3:
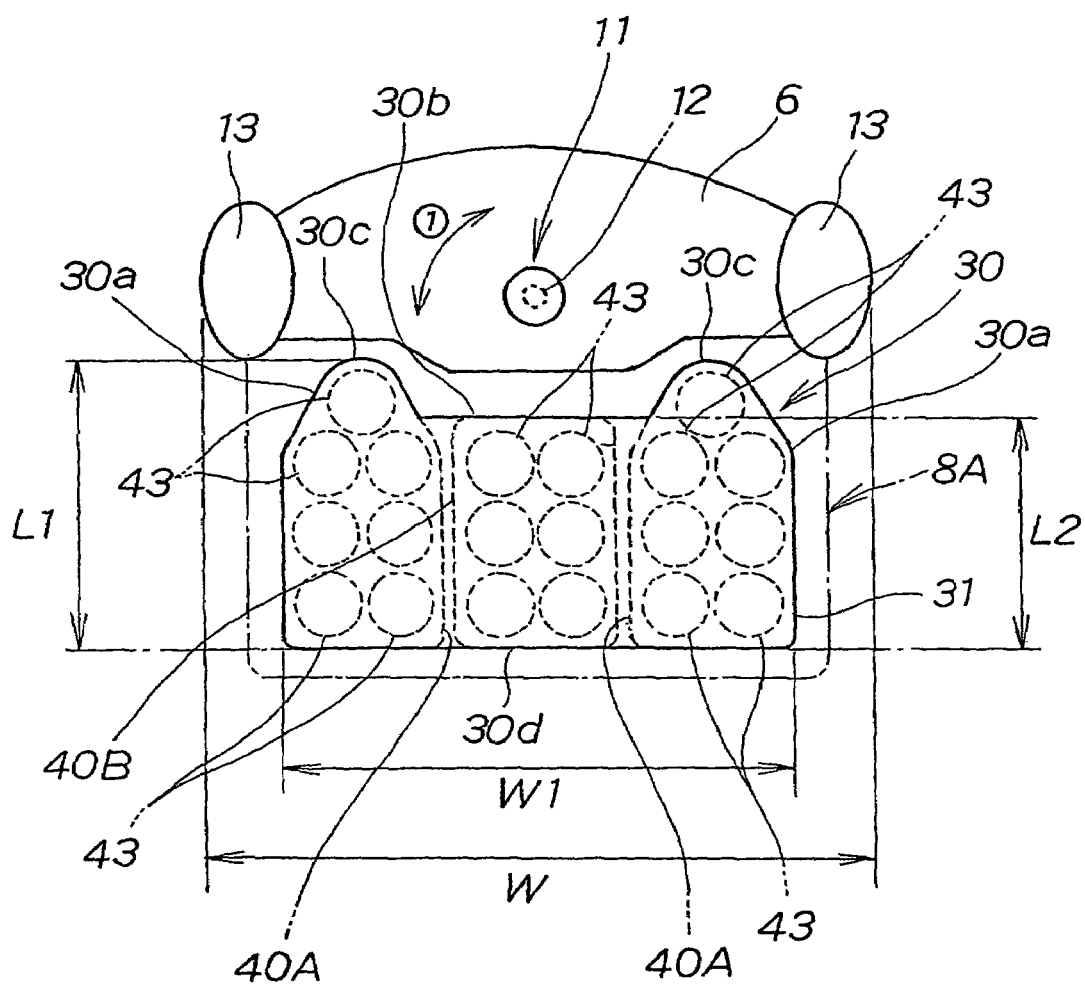
FIG. 3 is a plan view showing the relationship between an upper trunk of the robot in FIG. 2 and the storage battery.

In FIG. 3, a subbody 8A for covering the outside of the storage battery 30 has a width larger than the subbody 8, but the width is within the shoulder width W and does not extend outward of the shoulder width W. The subbody 8a having the larger width is shown in a chain line.

Figure 5:
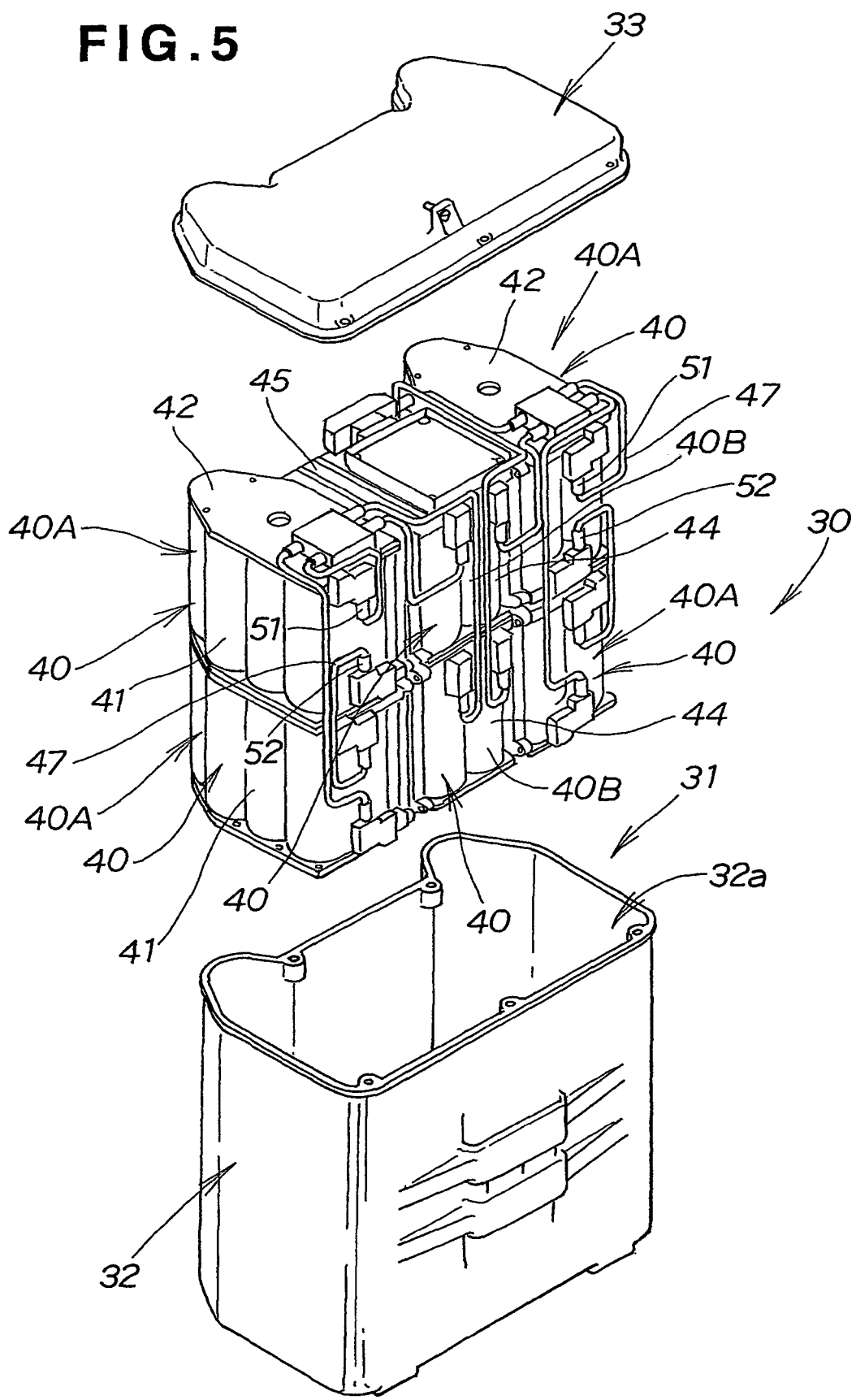
FIG. 5 is an exploded perspective view of the storage battery.

The storage battery 30 as shown in FIG. 3 has right and left battery modules 40A, 40A, each having larger capacity with seven battery cells 43 housed in an inner case, and a middle battery module 40B having smaller capacity with six battery cells 43 housed in an inner case. Each of the battery modules 40A, 40A and 40B is superposed on a battery module of the same structure as shown in FIG. 5.

The storage battery 30 has, with a rear surface 30d as the base, right and left parts 30a, 30a with front parts protruding forward. The parts 30a, 30a have a larger length L1 in the forward and backward direction, and a middle part 30b has a smaller length L2 in the forward and backward direction, forming a recess in a plan view.

The right and left battery modules 40A, 40A have front parts 30c, 30c in a tapered shape in a plan view, and each holds the seven battery cells in total, one in the tapered part and six in the rear part in two lines. The middle battery module 40B holds the six battery cells 43 in total in two lines.

The storage battery 30 is mounted to the back of the upper trunk 6 via the subbody 8 (8A). The rotation axis 12 of the upper trunk 6 is arranged in front of the middle battery module 40B with smaller capacity in the storage battery 30. The right and left battery modules 40A, 40A with larger capacity are arranged rearward on the right and left sides of the rotation axis 12. The upper trunk 6 rotates about the rotation axis 12 to the right or left relative to the lower trunk 7 as shown by arrow ①.

The storage battery 30 having the battery modules 40A, 40B and 40A with different capacities is housed in an outer case 31 in a unit. Of the battery modules, the battery modules 40B with smaller capacity are arranged in the middle part, and the battery modules 40A, 40A with larger capacity are arranged on each side of the modules 40B. This arrangement makes the rotation axis 12 positioned in the vicinity of the battery modules 40B with smaller capacity in the middle part, preventing interference between the rotation axis 12 and the storage battery 30.

The battery modules 40A, 40A with larger capacity are arranged on the right and left of the battery modules 40B with smaller capacity in a manner that the modules 40A, 40A are held within the shoulder width W of the robot 1, thereby to minimize the lateral width dimension of the storage battery 30 in its entirety. Accordingly, it becomes possible to secure a sufficient amount of capacity of the storage battery while achieving the compact appearance of the storage battery 30.

The right and left battery modules 40A, 40A with larger capacity are housed in the outer case 31 which partly protrudes forward toward the upper trunk 6 so as to surround the rotation axis 12. When the upper trunk 6 rotate as shown by arrow ①, the battery modules 40A, 40A rotates about the rotation axis 12, surrounding the rotation axis 12. In other words, the right and left battery modules 40A, 40A are housed in the right and left parts 30a, 30a of the outer case 31 having the tapered parts 30c, 30c, and the middle battery modules 40B are housed in the middle part 30b of the outer case 31, so that the battery modules as a whole are arranged around the rotation axis 12, surrounding the rotation axis 12. This arrangement prevents the mass of the storage battery 30 from increasing its moment of inertia around the rotation axis 12 when the upper trunk 6 with the storage battery 30 mounted thereon rotates, eliminating the effect of the moment of inertia.

The right and left front parts of the case of the storage battery 30 are protruded forward in a tapered shape, being prevented from interfering with the rotation axis 12. A larger number of the battery cells 43 are housed in the right and left parts 30a, 30a of the case of the storage battery 30 than in the middle part 30b of the case, which secures sufficient storage capacity of the storage battery 30 as a whole, reducing the outer dimension, especially the lateral width dimension of the storage battery, thereby providing the compact battery.

As described above, the storage battery 30 is mounted to the back of the upper trunk 6 of the robot 1 as shown in FIG. 1, arranged below the head 5 provided on the upper end of the upper trunk 6, and positioned in a region within the shoulder width of the upper trunk 6. Accordingly, the center of gravity of the robot 1 as a whole can be positioned upper, closer to the upper end of the robot as a whole, which enables appropriate attitude stabilization control of the robot, based on an inverted pendulum model.

Most noted point is that the subbody 8 containing the storage battery 30 carried on the back of the upper trunk 6 of the robot 1 walking, has two lateral sides 8a, 8a within the shoulder width W as shown in FIG. 2, so that when the robot 1 walks a place having a slightly larger width than the width of the robot 1, such as a narrow passage or corridor, the subbody 8 does not interfere with the passage or corridor. Thus the robot carrying the storage battery on the back can walk without interfering with surroundings such as a narrow passage or corridor. Further, as the storage battery 30 is mounted to the back of the upper trunk 6 in a region within the shoulder width W, a large open space in the back of the upper trunk and a rear space thereof can be utilized to mount the storage battery with large capacity.

Figure 4:
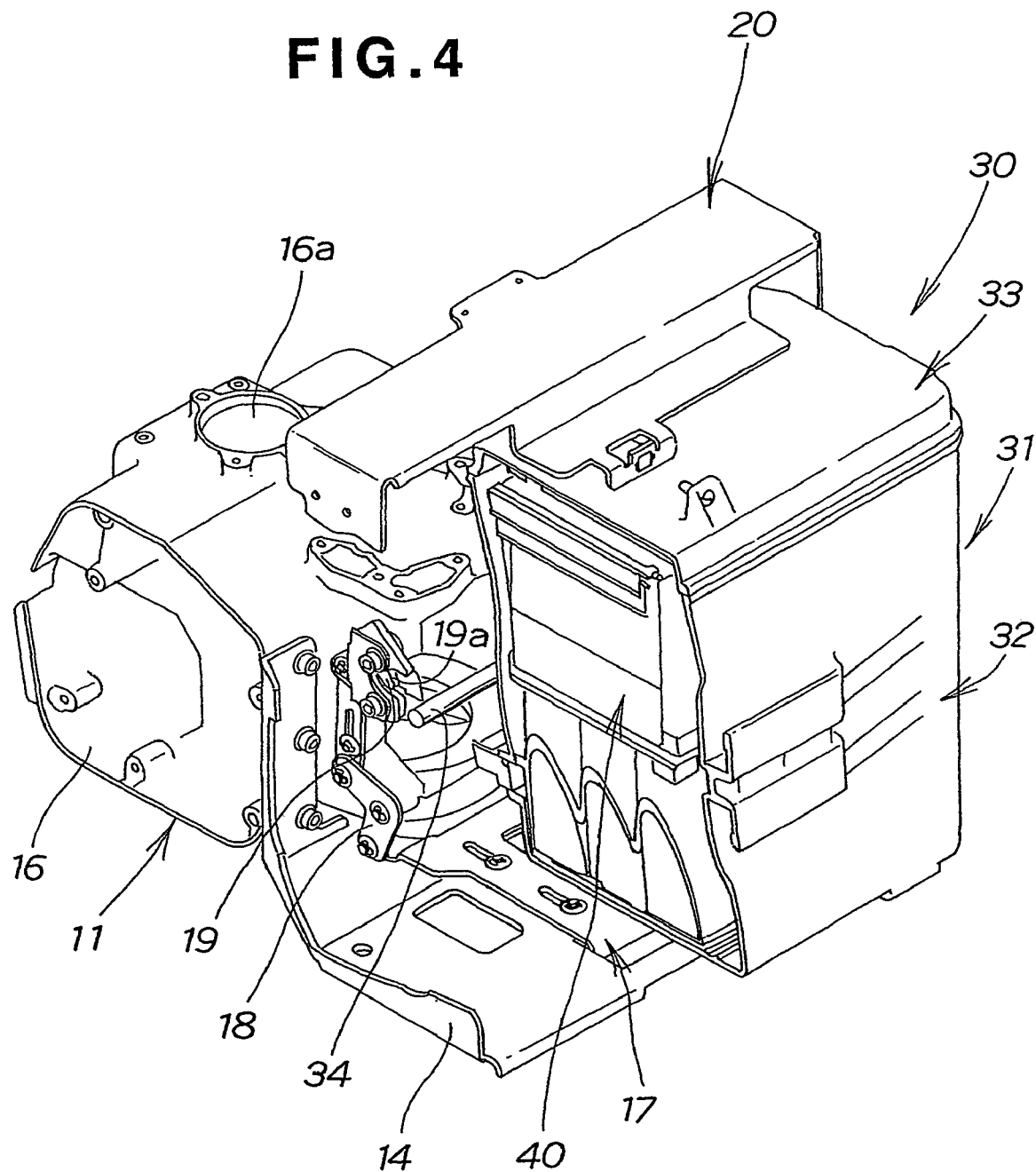
FIG. 4 is a perspective view showing a supporting structure for the storage battery at the upper trunk of the robot.

FIG. 4 shows an embodiment of a supporting structure for a storage battery on an upper trunk of a robot.

A storage battery 30 has an outer case 31 and a plurality of battery modules 40 housed in the outer case 31. The outer case 31 has a case body with a bottom and a cover 33 constituting a lid. Each of the battery modules 40 has battery cells to be described later, housed in an inner case.

A housing 16 of a rotation mechanism 11 provided in an upper trunk 6 has a through hole 16a for a rotation axis 12 as shown in FIG. 1. A supporting member 14 in a sectionally L shape for supporting the storage battery 30 is mounted to a rear surface of the housing 16.

A locking hook 19 in a C shape is rotatably provided on a rear surface of the housing 16. The locking hook 19 is connected to a L-shaped link 18. The L-shaped link 18 is connected to a supporting table 17 disposed on the supporting member 14.

A locking bar 34 is transversely secured to the front surface of a body 32 of the outer case 31. An upper presser plate 20 is provided on an upper part of the cover 33.

FIG. 4 shows a state where the storage battery 30 is about to be mounted and supported. Moving the storage battery 30 forward makes the locking bar 34 engage with an engaging recess 19a which opens to the rear of the locking hook 19, and rotate the locking hook 19. The rotation of the locking hook 19 rotates the L-shaped link 18, to move up the supporting table 17 connected to the L-shaped link 18 on the supporting member 14. The upward motion of the supporting table 17 lifts the bottom of the storage battery 30 (the bottom of the outer case). The storage battery 30 is resultantly fixed and held between the supporting table 17 and the upper presser plate 20.

Now details of the storage battery 30 will be described with reference to FIGS. 5 and 6.

The storage battery 30 has a plurality of battery modules 40, six in this embodiment, housed in the outer case 31. The battery modules 40 consists of four side modules 40A arranged on the right and left sides, being stacked in two layers, respectively, and two upper and lower middle modules 40B, 40B arranged in the middle part.

The four battery modules 40A stacked in two layers on the right and left sides, respectively, and the upper and lower battery modules 40B, 40B in the middle part are united. The battery modules in a unit is inserted from an upper opening 32a of the case body 32 and housed in the case body 32. After housing, the cover 33 is put over the case body 32, to complete the storage battery 30.

The battery modules 40A positioned on the right and left sides have the same configuration. The upper and lower battery modules 40B in the middle part have the same configuration.

Figure 6:
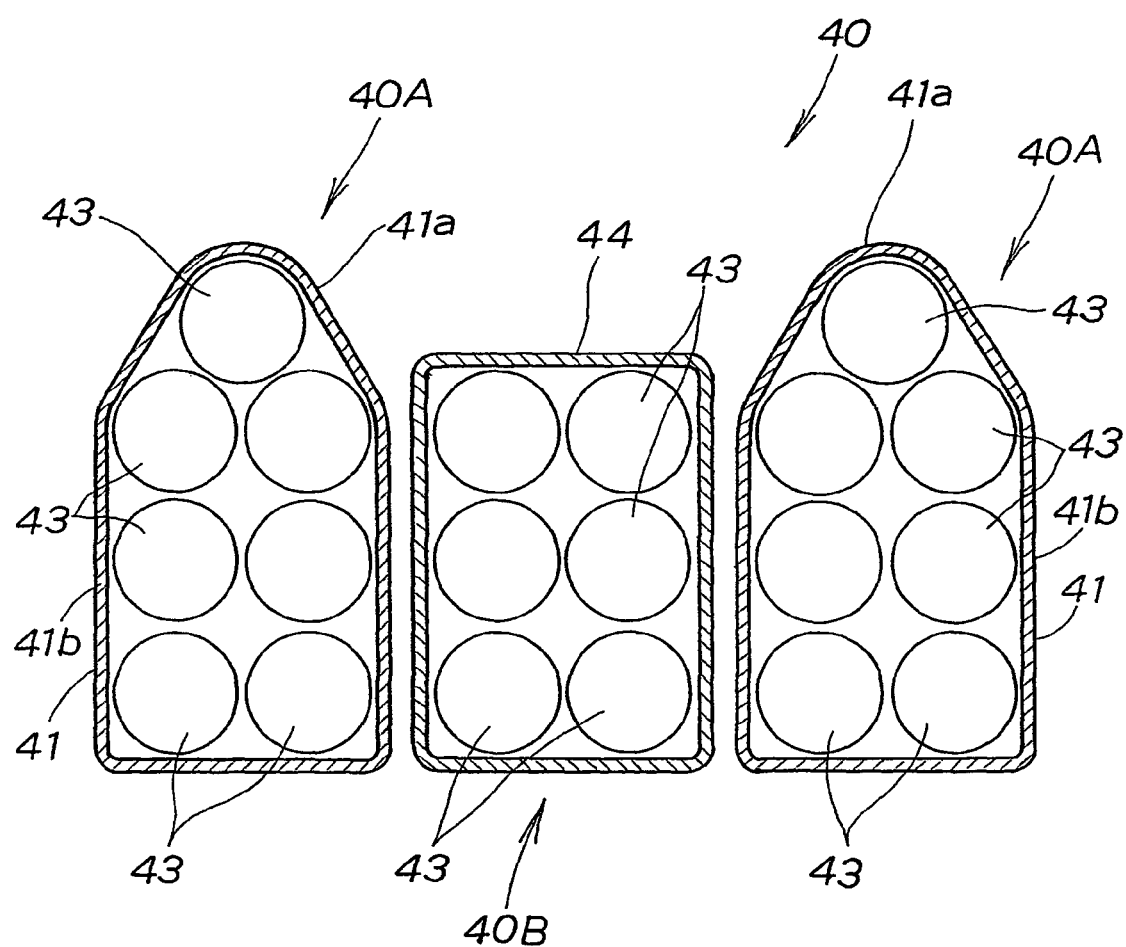
FIG. 6 is a sectional view schematically showing a plurality of battery modules constituting the storage battery.

As shown in FIGS. 5 and 6, each storage battery module 40A has an inner cover 41 with a bottom and a lid plate 42. The inner cover 41 elongates in the forward and backward direction in a plan view and has a front part 41a in a tapered shape. The inner cover 41 shown in this embodiment houses seven battery cells 43 in total, one in the tapered front part 41a, and six in two lines in a larger-width body 41b. The upper and lower battery modules 40A have the same size and configuration.

Each battery module 40B in the middle part has a rectangular inner case 44 elongating in the forward and backward direction in a plan view, and a lid plate 45. The inner case 44 houses six battery cells 43 in two lines.

The battery modules 40A on the right and left sides, each housing the seven battery cells 43 with the inner cover 41 and the lid plate 42, are stacked in two layers, respectively, and the battery modules 40B, 40B in the middle part, each housing the six battery cells 43 with the inner case 44 and the lid plate 45, are stacked in two layers. The battery modules 40A, 40B and 40A are united and housed in the outer case 31 as shown in FIG. 5, to complete the storage battery 30.

The seven battery cells 43 housed in each of the right and left and upper and lower four side battery modules 40A are connected in series in the module. The six battery cells 43 housed in each of the upper and lower two middle battery modules 40B, 40B are connected in series in the module. The battery modules 40A and 40B are then connected in series.

As described above, the storage battery is divided into the middle modules 40B and the modules 40A, 40A on the right and left sides to be mounted, and the battery modules are electrically connected to one another, and the battery cells of the storage battery are housed in the inner cover 41 or case 44 of the battery modules to be held securely. Accordingly, such a storage battery having a large number of battery cells does not rattle while the robot is walking or moving, improving stability in holding the storage battery having the large number of cells, further improving the stability in holding the storage battery while the robot is walking or moving. In a bipedal robot, effect of shifting of the center of gravity while the robot is walking can be reduced.

Figure 7:
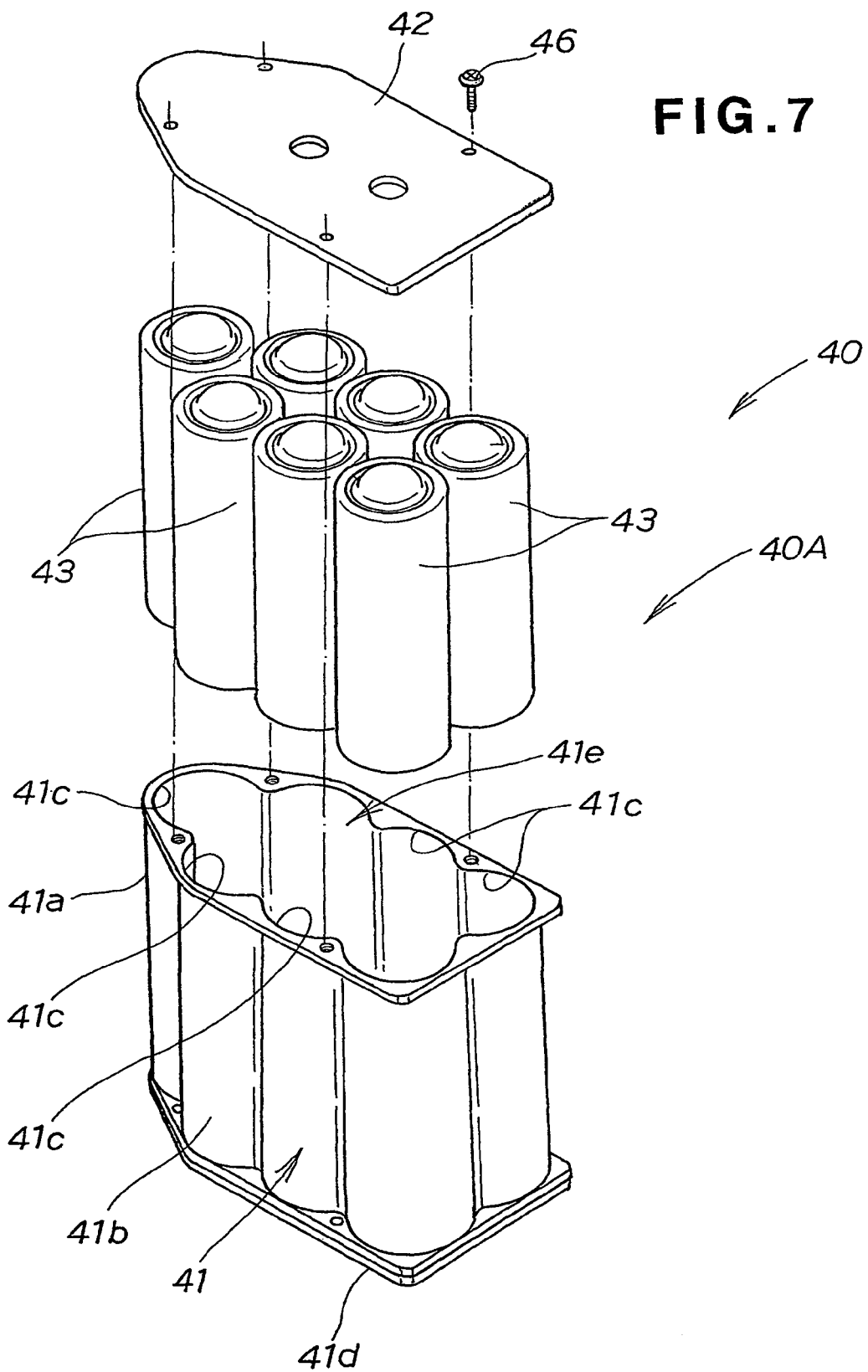
FIG. 7 is an exploded perspective view of the battery module with larger capacity.

FIG. 7 is an exploded perspective view of the side battery module 40A.

The inner cover 41 is made of insulating synthetic resin, and has a plurality of recesses 41c having an arc shape in a plan view, formed in the inner wall surface of the inner cover 41 to match the outer shape of the battery cells 43 to be housed inside. The bottom of the inner cover 41 is closed by a bottom plate 41d.

Of the seven battery cells 43 in a cylindrical shape, one is housed in the front portion 41a of the inner cover 41 and six are housed in the body 41b. The battery cell 43 is fitted into the recess 41c at part of its outer periphery to be positioned, and also is positioned in the cover 41 by engagement with protrusions provided both on the internal bottom of the inner cover 41 and the rear surface of the lid plate 42, thereby being prevented from rattling in the inner cover 41 and lid plate 42.

Figure 8:
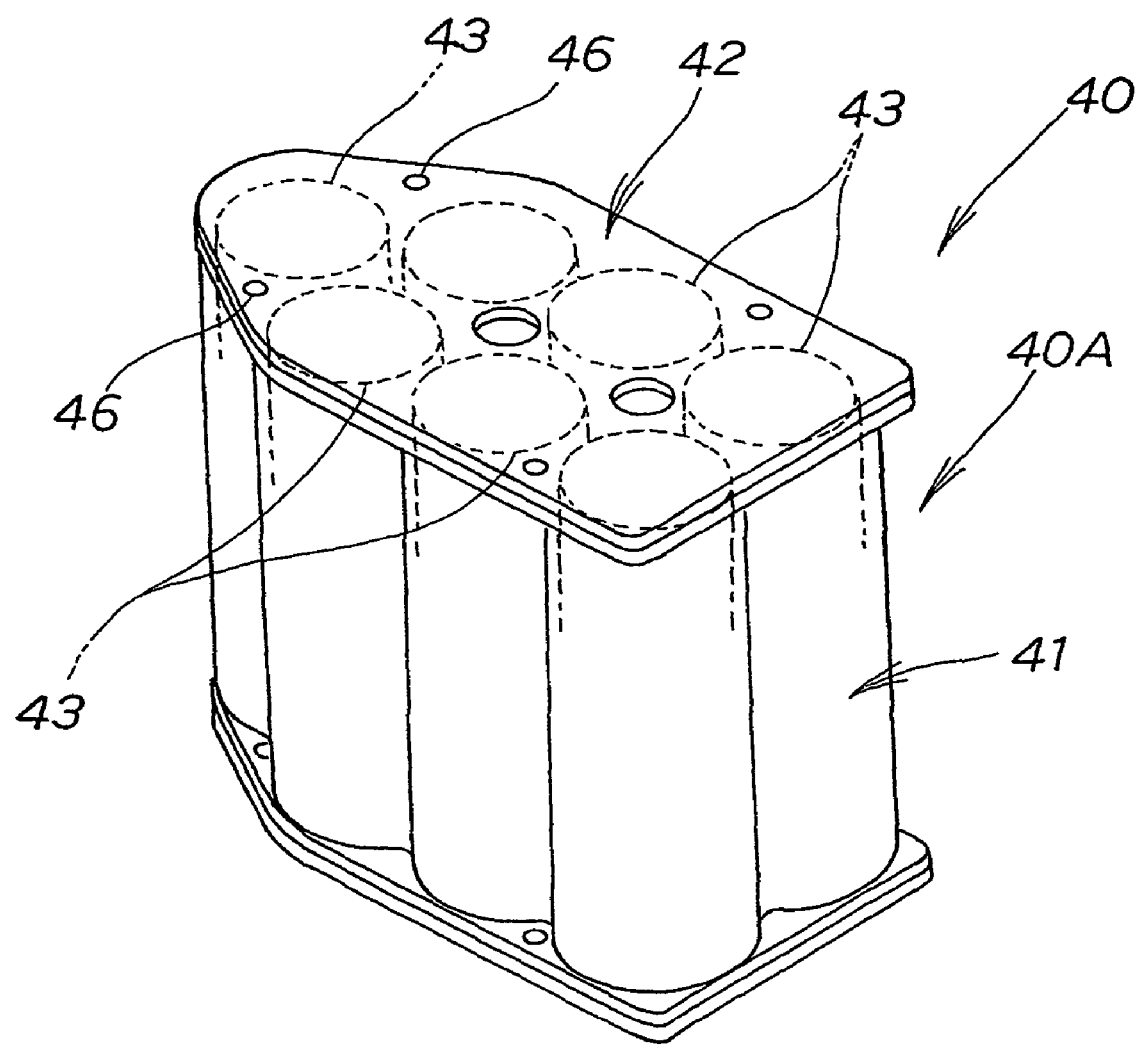
FIG. 8 is a perspective view showing the battery module in FIG. 7 in an assembled state.

The battery cells 43 are inserted into the inner cover 41 to be positioned and housed, then the lid plate 42 is put over the upper opening 41e of the inner cover 41, and the lid plate 42 is fastened to the upper end of the inner cover 41 via a plurality of screws 46. FIG. 8 shows a state where the lid plate 42 is put over the inner cover 41 and is fastened with the screws 46, to complete the side battery module 40A.

Figure 9:
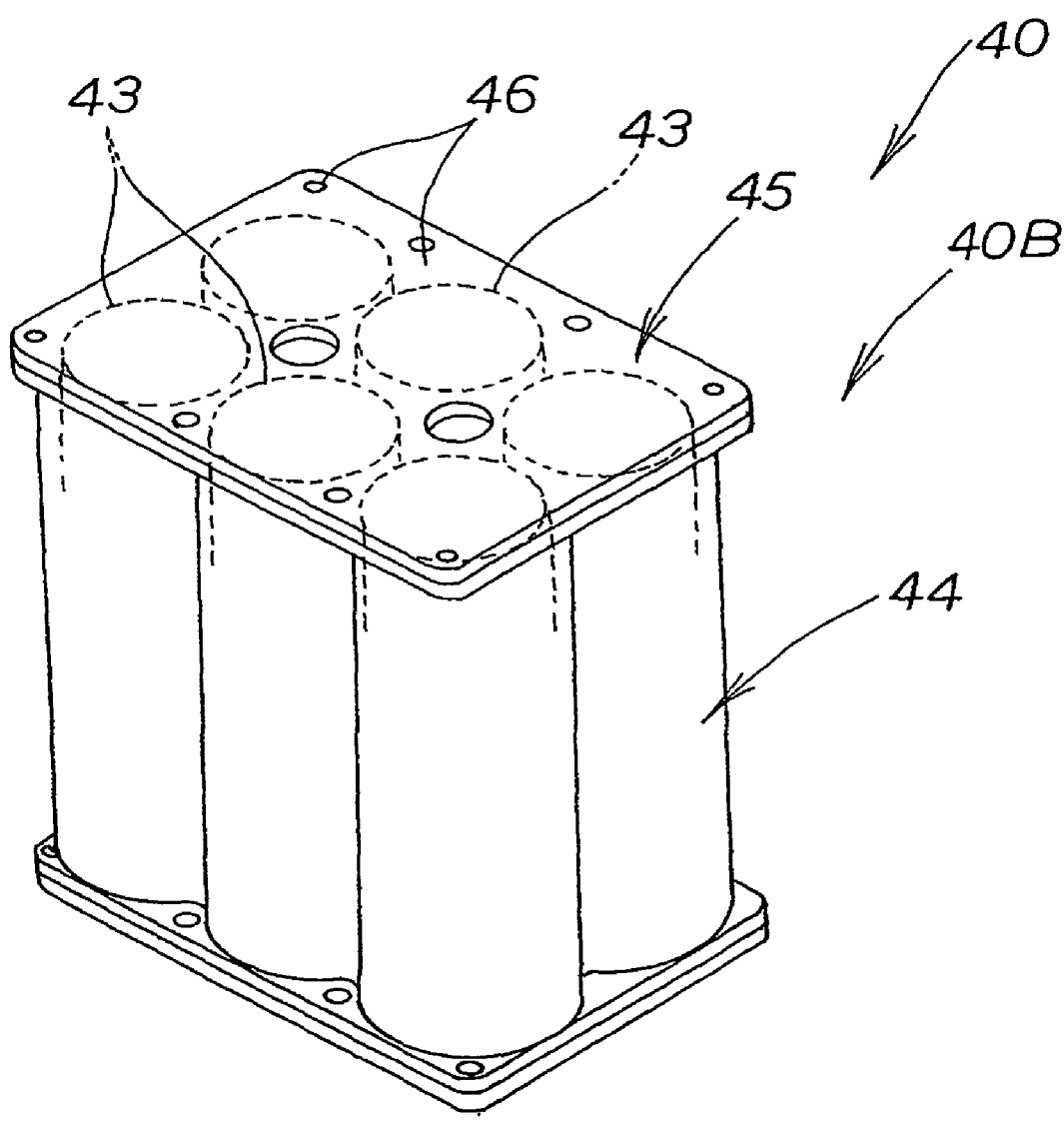
FIG. 9 is a perspective view showing the battery module with smaller capacity positioned in the middle part.

FIG. 9 shows the middle battery module 40B.

The module 40B has a rectangular inner case 44 elongating in the forward and backward direction in a plan view and having a bottom, and a lid plate 45 for closing the upper part of the case 44. The inner case 44 has arc-shaped recesses for the outer shape of a plurality of battery cells 43, formed in the internal wall. After inserting the battery cells 43 into the inner case 44 along the recesses, the six battery cells 43 are positioned by protrusions provided on both the rear surface of the lid plate 45 and the bottom of the inner case 44, to be prevented from rattling after being housed.

Figure 10:
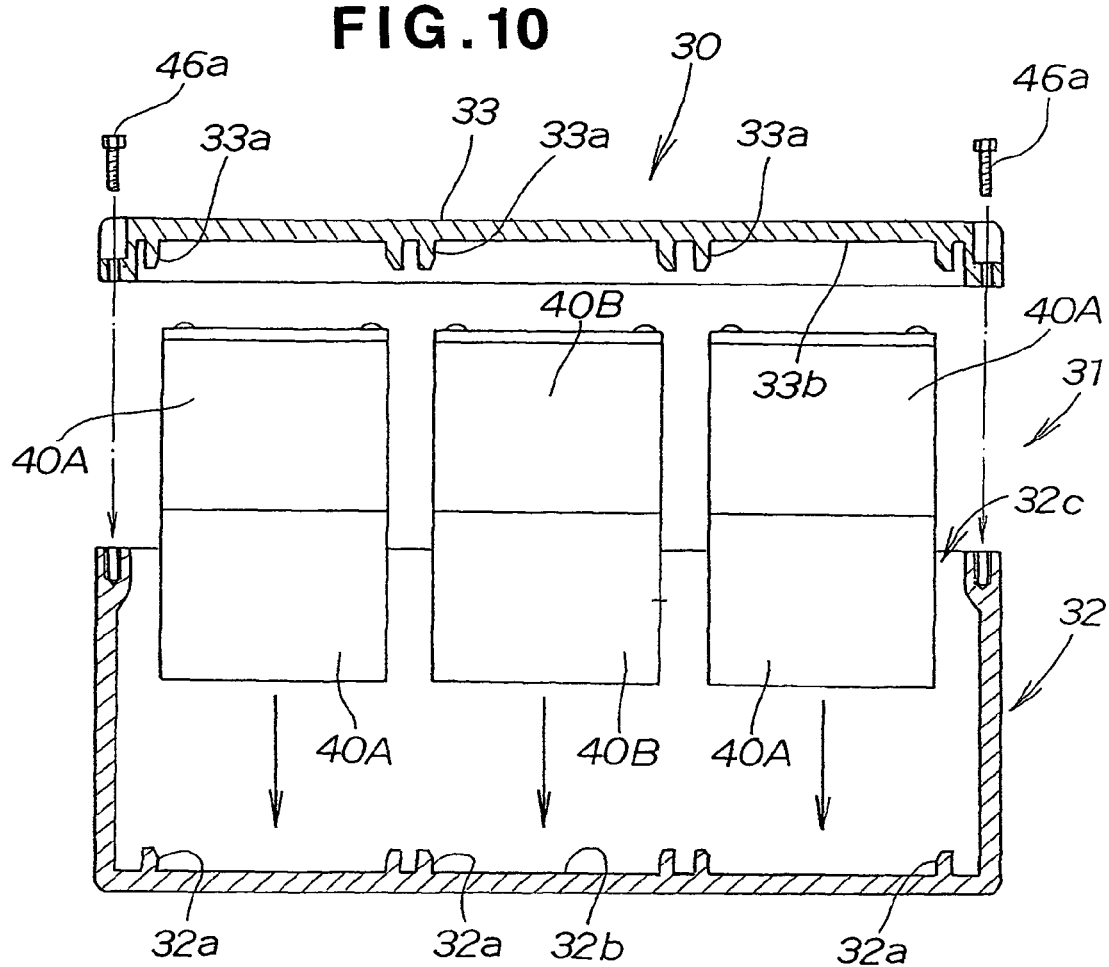
FIG. 10 is sectional view showing how the plurality of battery modules in FIGS. 8 and 9 are housed in an outer case.
Figure 11:
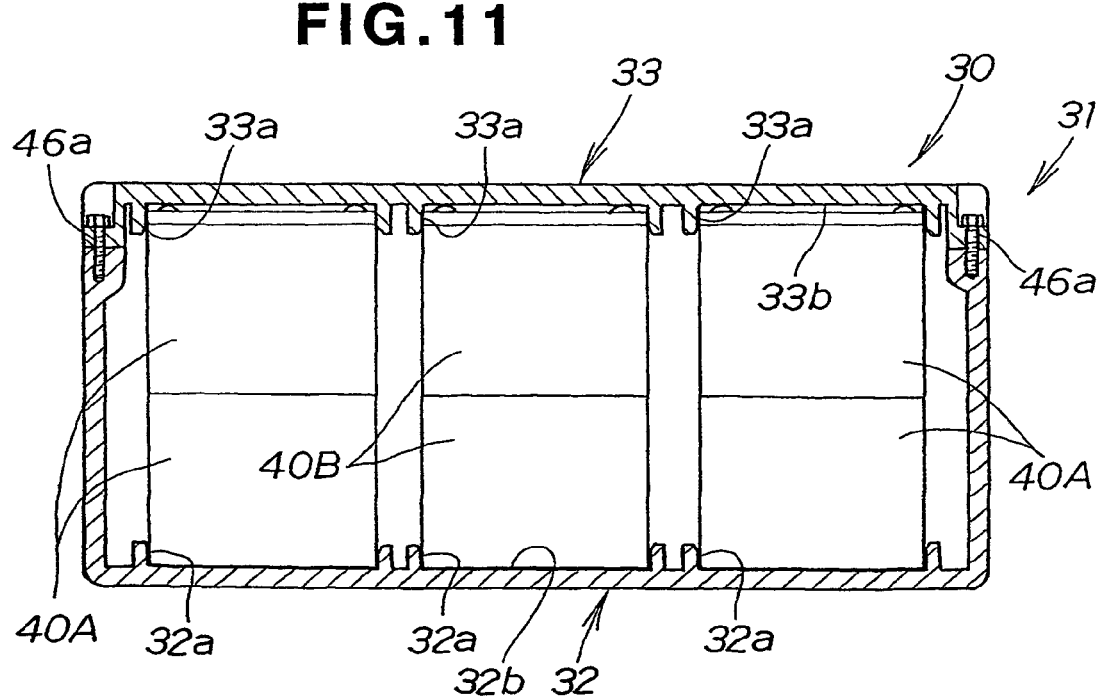
FIG. 11 is a sectional view showing the plurality of battery modules in FIG. 10 inserted into a case body with a cover closed.

FIGS. 10 and 11 are sectional views showing how a plurality of battery modules is housed in the outer case 31 which gives the outer shape of the storage battery 30.

A plurality of positioning protrusions 32*a*, 33*a* are provided on both a bottom upper surface 32*b* of the case body 32 and a rear surface 33*b* of the cover 33, for positioning the battery modules 40A, 40B stacked in two layers, respectively. The positioning protrusions 32*a*, 33*a* are fitted into the bottom parts and top parts of the battery modules 40A, 40B.

As shown in FIG. 10, from an opening 32*b* of the case body 32 of the outer case 31, the right and left battery modules 40A, 40A and the middle battery modules 40B, stacked in two layers, respectively, are inserted and are fitted to the positioning protrusions 32*a* formed on the bottom upper surface 32*b* of the case body 32. Then, the cover 33 is put over from above, and the positioning protrusions 33*a* formed on the rear surface 33*b* of the cover 33 are fitted into the top parts of the battery modules 44A, 44B. Thereafter, a plurality of screws 46*a* are fastened at the periphery of the cover 33, to connect the cover 33 to the case body 32 to complete the storage battery 30 as shown in FIG. 11.

Figure 12:
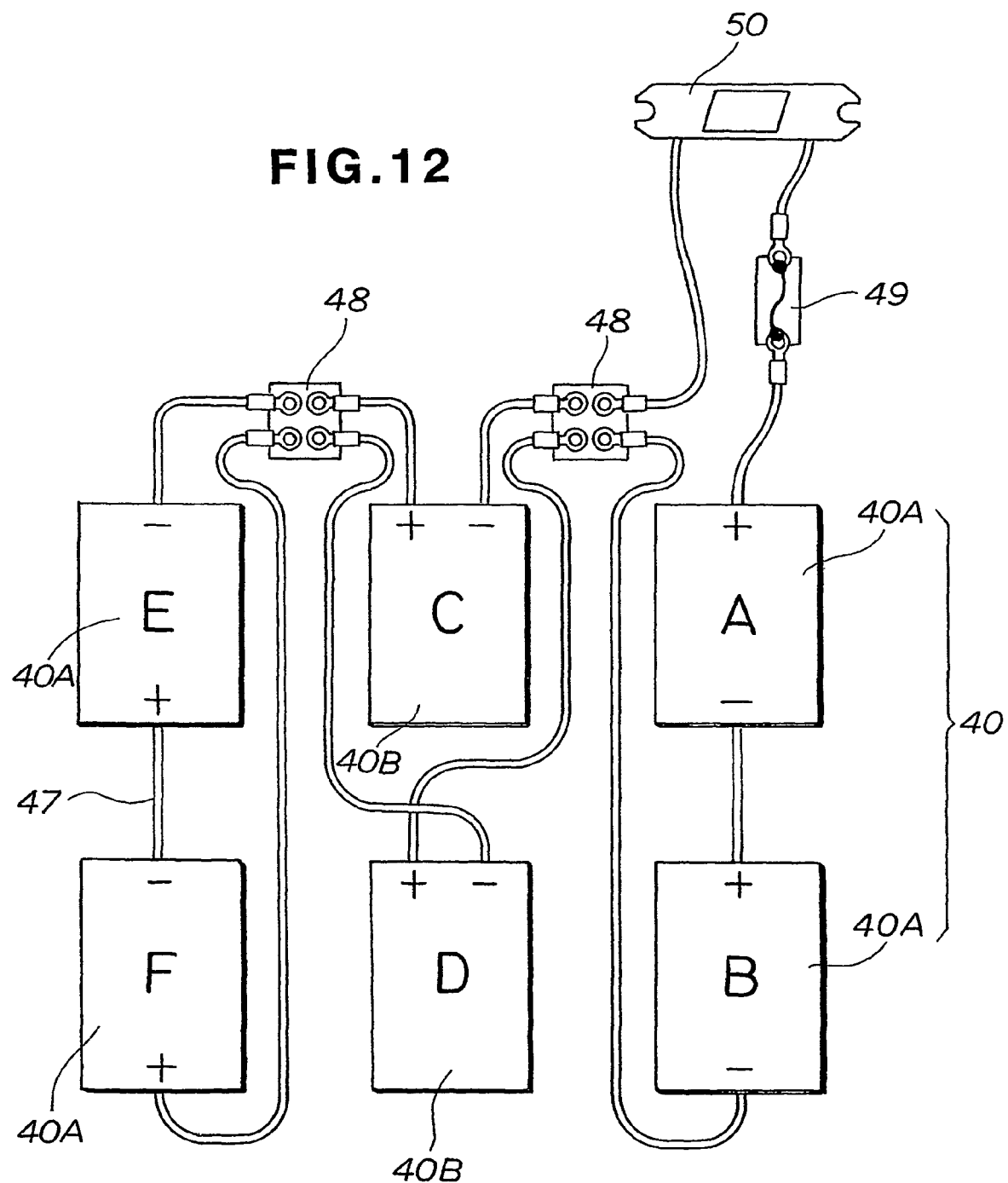
FIG. 12 is a schematic diagram showing the plurality of battery modules connected in series.

FIG. 12 shows a state where the plurality of battery modules 40A, 40B is electrically connected to one another.

In this embodiment, the storage battery 30 has on the right and left sides the four battery modules 40A each housing the seven battery cells, and on the middle part the two battery modules 40B each housing the six battery cells. Those modules are denoted by reference signs A to F, respectively. Those A to F modules 40A, 40B are connected in series via wires 47 and terminals 48. In this embodiment, the positive terminal is connected via a fuse 49 to a general terminal 50.

Figure 13:
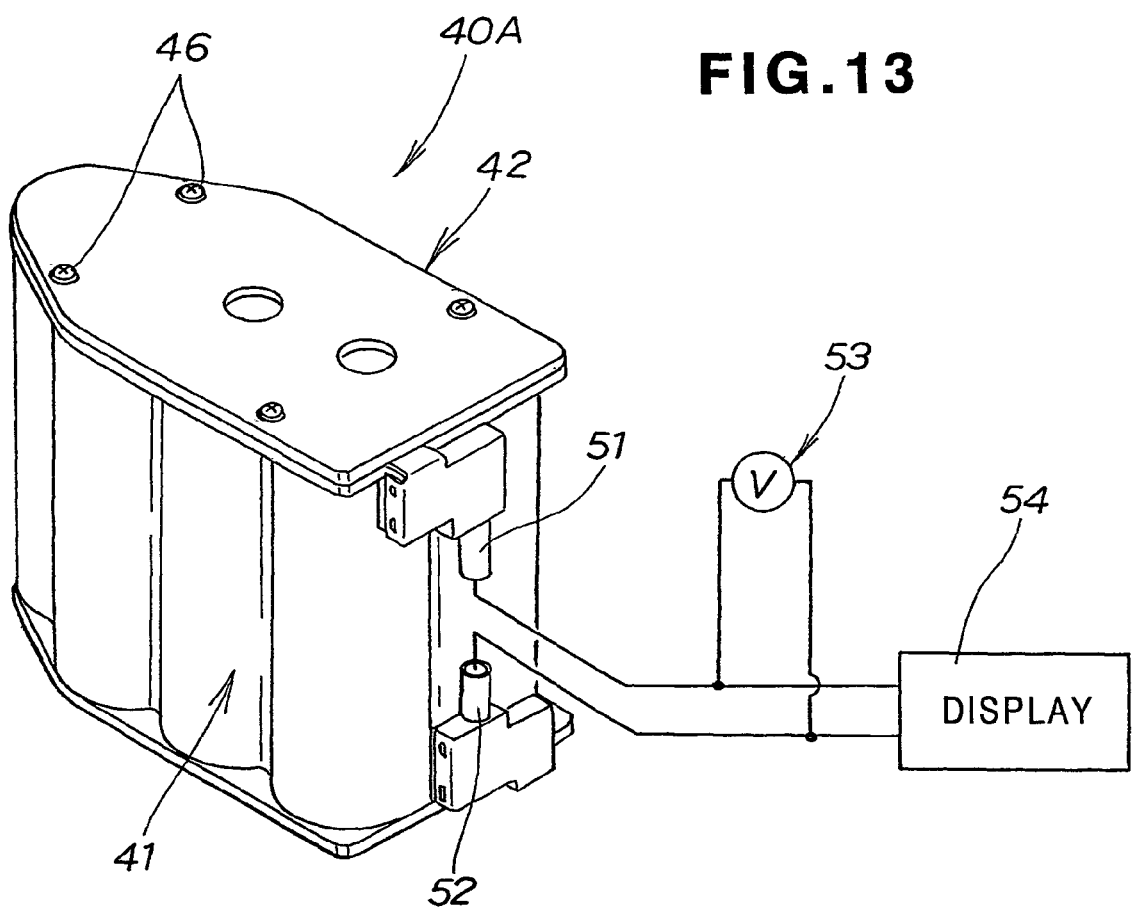
FIG. 13 is an explanatory view showing that outer connection terminals are provided on the back of a battery module so as to measure the storage capacity of the battery module, thereby to check the quality of the module.

FIG. 13 shows an embodiment for checking storage capacity of a battery module.

Outer connection terminals 51, 52 are provided on a back surface of an inner cover 41 of a battery module 40A. Adjacent battery modules 40A and 40B are connected in series via the outer connection terminals 51, 52 and wires 47. Such connected state is shown in FIG. 5 in appearance, and is shown in FIG. 12 schematically.

The outer connection terminals 51, 52 of the battery module 40A are exposed outside at the back of the inner cover 41. Between the outer connection terminals 51, 52, a voltmeter 53, for example, is connected so as to measure the voltage of the battery module 40A. The result of the measurement is shown on a display 54 as digital or analog information. Thus the voltages of the battery modules 40A, 40B constituting the storage battery 30 can be measured individually, to check the storage capacities of the individual battery modules after charging or discharging. Accordingly, battery modules constituting a storage battery can be checked in voltage individually, which enables checking the quality of each battery module.

If there is a defect in a storage battery, a defective battery module having insufficient voltage can be detected easily. Thus the replacement of the defective battery module is facilitated, eliminating the need for replacing the entire storage battery including the defective battery module.

For a battery cell in this embodiment, used is a lithium-ion secondary battery having high energy density, light weight and enabling long-time driving, which characteristics are preferable for making the bipedal robot walk or work.

Figure 14:
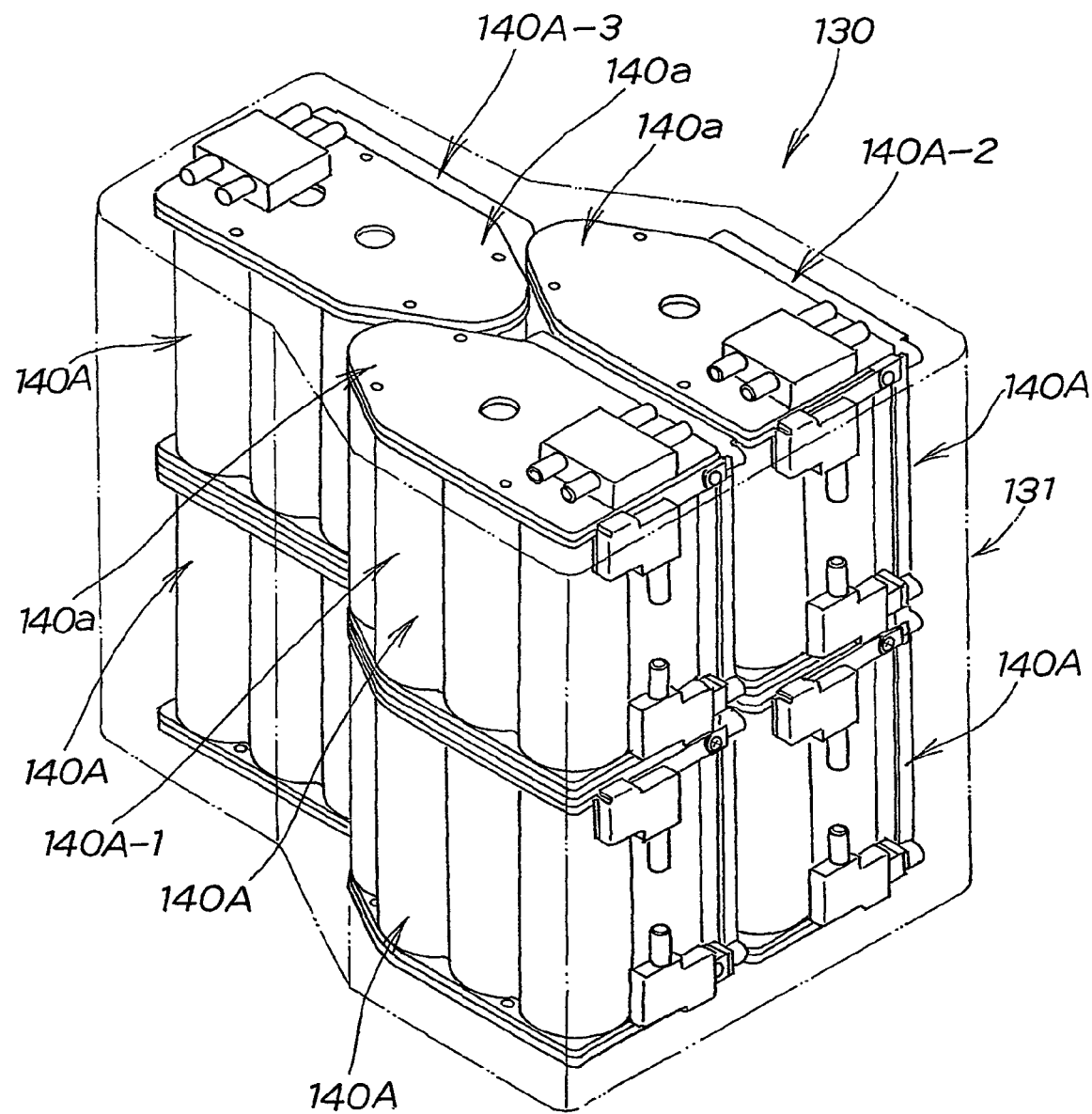
FIG. 14 is a perspective view of a storage battery according to another embodiment.

FIG. 14 shows a storage battery 130 according to another embodiment.

In this embodiment, battery modules 140A constituting the storage battery 130 has the same structure as that of the battery module 40A housing the seven battery cells 43 as shown in FIGS. 7 and 8.

The upper and lower stacked battery modules 140A, 140A (a battery module 140A-1) are arranged side by side with the upper and lower stacked battery modules 140A, 140A (a battery module 140A-2). Between tapered parts 140*a*, 140*a* of the battery modules 140A-1 and 140A-2, tapered parts 140*a* of the upper and lower stacked battery modules 140A, 140A (a battery module 140A-3) are interposed. That is, the tapered parts 140*a*, 140*a* of the two battery modules 140A-1 and 140A-2 are combined with the tapered part 140*a* of the battery module 140A-3 in an opposing manner. The combined modules are housed in an outer case 131 shown in imaginary lines.

Figure 15:
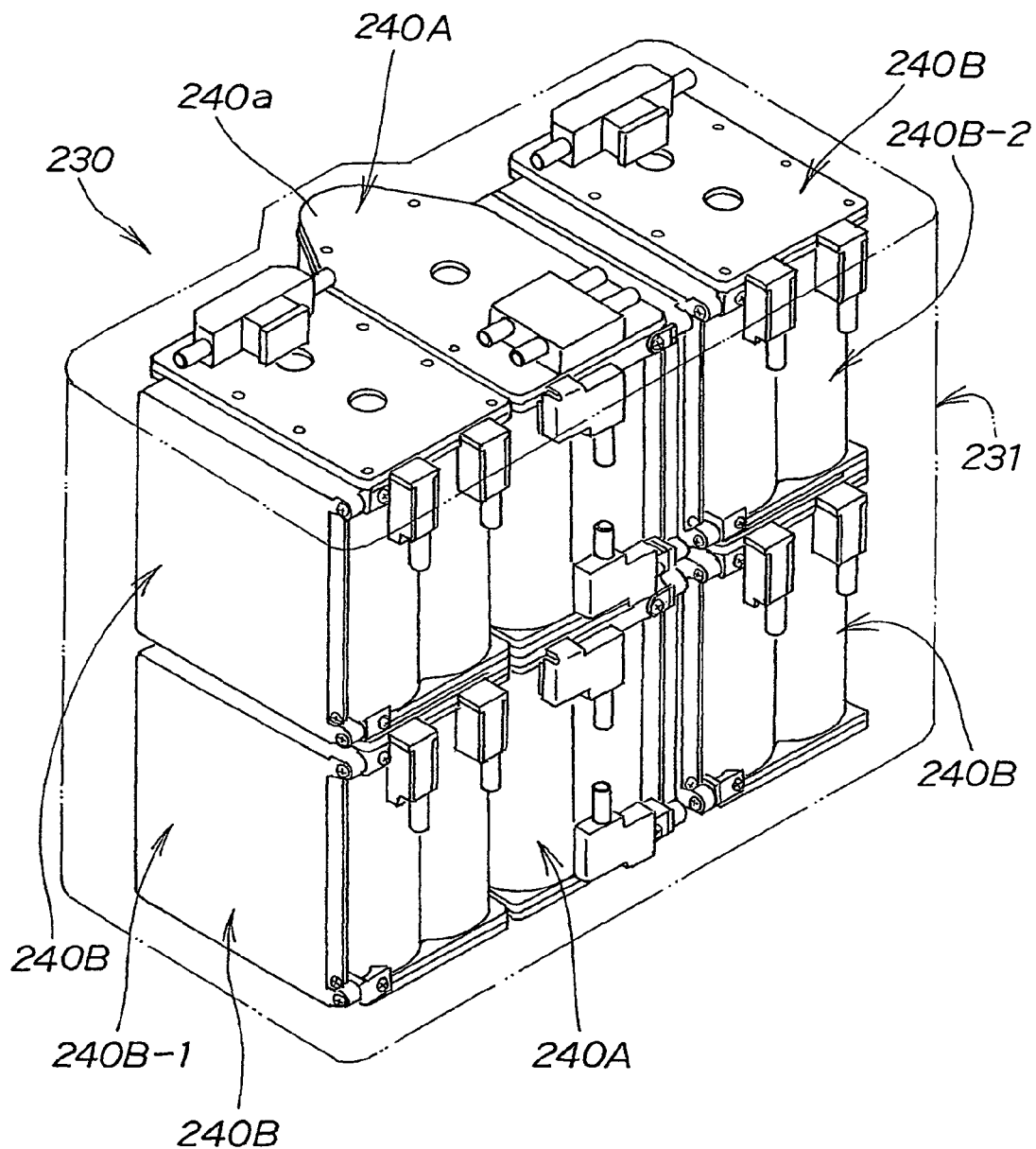
FIG. 15 is a perspective view showing a storage battery according to yet another embodiment.

FIG. 15 shows a storage battery 230 according to yet another embodiment.

Each of battery modules 240B houses six battery cells. Each of battery modules 240A houses seven battery cells.

The battery modules 240A, 240A housing the seven battery cells and having tapered parts respectively are stacked in two layers. Battery modules 240B-1 and 240B-2 each having the upper and lower stacked battery modules 240B, 240B each housing the six battery cells are arranged on the right and left sides of the battery modules 240A, 240A, respectively. The tapered parts 240*a* of the battery modules positioned in the middle protrude forwardly. The battery modules 240A, 240B are housed and held in an outer case 231 shown in imaginary lines.

INDUSTRIAL APPLICABILITY

A storage battery is mounted to a back part of an upper trunk of a robot. The storage battery is arranged with its lateral width within a shoulder width of the robot. Thus the storage battery is mounted within the shoulder width of the robot, which width defines the maximum width of a passage where the robot can pass, and is therefore prevented from interfering with the surroundings while the robot is walking or moving, thereby enabling a useful bipedal humanoid robot.

The invention claimed is:

1. A bipedal robot with a storage battery comprising:
   a trunk comprising an upper trunk having shoulders at right and left sides thereof and a lower trunk positioned below the upper trunk, said upper trunk and said lower trunk being mounted rotatably relative to one another about a vertical rotation axis;
   two legs extending downward from a lower end of said lower trunk;
   two arms extending from said shoulders of said upper trunk;
   a head provided on an upper end of said upper trunk; and
   a storage battery mounted on a back surface of said upper trunk, said storage battery residing outside the trunk and positioned below a top of said head and above a reference center of gravity point of said robot in a region within a shoulder width of said trunk, said storage battery comprising a plurality of battery modules having different storage capacities, said plurality of battery modules being united and housed in a case, including small capacity and large capacity battery modules, said small capacity battery modules being arranged in a middle part of the storage battery, said large capacity battery modules being arranged on each side of said small capacity battery modules in portions of said case that protrude forward toward said trunk so as to surround said rotation axis.

2. A robot as set forth in claim 1, wherein a front part of said protruding portions of said case protrudes forward in a tapered shape that prevents said front part of said case from interfering with said rotation axis.

* * * * *

UNITED STATES PATENT AND TRADEMARK OFFICE
CERTIFICATE OF CORRECTION

PATENT NO. : 7,073,614 B2
APPLICATION NO. : 10/399063
DATED : July 11, 2006
INVENTOR(S) : Saito et al.

It is certified that error appears in the above-identified patent and that said Letters Patent is hereby corrected as shown below:

Title Page
In section (56), References Cited, please insert under OTHER DOCUMENT -- "The Development of Honda Humanoid Robot," Hirai et al., Proceedings of the 1998 IEEE International Conference on Robotics and Automation, Leuven, Belgium, pp. 1321-1326 (5/98). --.

Signed and Sealed this

Nineteenth Day of September, 2006

JON W. DUDAS
*Director of the United States Patent and Trademark Office*